United States Patent Office 3,458,539
Patented July 29, 1969

3,458,539
3,17,19-TRIOXYGENATED-Δ⁵-ANDROSTENES
Albert Wettstein, Riehen, Georg Anner, Karl Heusler, and Jaroslav Kalvoda, Basel, and Hellmut Ueberwasser, Riehen, Switzerland, assignors to Ciba Corporation, New York, N.Y., a corporation of Delaware
No Drawing. Continuation-in-part of applications Ser. No. 122,655, and Ser. No. 122,656, July 10, 1961. This application Sept. 7, 1962, Ser. No. 222,206
The portion of the term of the patent subsequent to Dec. 4, 1979, has been disclaimed
Int. Cl. C07c *169/22, 169/24, 169/20*
U.S. Cl. 260—397.1                                                7 Claims

ABSTRACT OF THE DISCLOSURE 19-oxygenated $\Delta^5$-androstenes of the formula

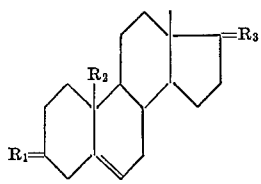

wherein $R_1$ stands for a hydrogen atom together with a free or esterified hydroxyl group or for an oxo group, $R_2$ stands for a free or esterified hydroxymethyl group, for an aldehyde group or for a free or esterified carboxyl group, $R_3$ stands for oxo, $\beta$-hydroxy or $\beta$-acyloxy together with hydrogen or together with lower alkyl, lower alkenyl or lower alkinyl. The compounds are intermediates for the preparation of 19-nor steroids useful as anabolic, anorogenic or progestational agents.

This application is a continuation-in-part of our copending applications Ser. No. 122,655, now Patent No. 3,067,-198, filed July 10, 1961 and Ser. No. 122,656, now Patent No. 3,077,482, filed July 10, 1961 by Albert Wettstein et al.

The present invention relates to new 19-oxygenated $\Delta^5$-androstene of the formula

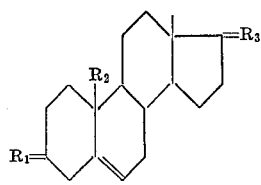

wherein $R_1$ stands for a hydrogen atom together with a free or esterified hydroxyl group or for an oxo group, $R_2$ stands for a free or esterified hydroxymethyl group, for an aldehyde group or for a free or esterified carboxyl group, $R_3$ stands for oxo, $\beta$-hydroxy or $\beta$-acyloxy together with hydrogen or together with lower alkyl, lower alkenyl or lower alkinyl.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenanthic, decanoic, trifluoracetic, carbonic-monomethyl- or ethylester, hexahydrobenzoic, cyclopentyl-propionic, phenylpropionic, benzoic or furoic acid. The halogen atoms mentioned are fluorine, chlorine or bromine, in the 5α-position especially chlorine or bromine, and the lower alkyl, alkenyl or alkinyl radicals are such as contain at most 7 carbon atoms, for example, methyl, ethyl, n- or i-propyl, -butyl, -pentyl, -hexyl or -heptyl, vinyl, allyl, methallyl, ethinyl, 2-methyl-ethinyl, 2-chloro-ethinyl and 2-trifluoromethyl-ethinyl.

Ketalized oxo groups are for example lower alkylenedioxy groups, such as ethylenedioxy or propylenedioxy groups and etherified hydroxy groups are for example lower alkoxy groups, such as methoxy, ethoxy or propoxy groups or the tetrahydro-pyranyloxy group.

The compounds of the present invention are important intermediates in a new and simple process for the conversion of normal steroids into 19-nor-steroids. Since a number of 19-nor-steroids, more especially derivatives of 19-nor-testosterone are used extensively as anabolic, androgenic and progestational agents the new process for the production of these compounds and the new intermediates obtained thereby are of great importance. So far the 19-nor-steroids were available only by a complicated sequence of reactions which involved pyrolytic aromatization of the ring A and subsequent reduction with an alkali metal and ammonia. An alternative synthesis uses a microbiological hydroxylation of the 19 carbon atom followed by elimination of the angular substituent. The 19-oxygenated $\Delta^5$-androstenes of the present invention can however not be prepared by any of the known processes.

The new process in which the claimed compounds are produced is as follows:

(a) A 5α-halogen-6β-hydroxy-androstane is treated with lead tetraacetate in boiling benzene or cyclohexane or with lead tetraacetate and iodine in boiling cyclohexane under irradiation with visible light to form a 5α-halogen-6β:19-oxido-androstane. If desired these oxides can be oxidized with chromium trioxide in acetic acid at 60–90° during 30–40 minutes to the 19:6β-lactone of the 5α-halogen-6β-hydroxy-androstane-19-acid. These steps of the process are described in detail in our copending applications Ser. No. 222,168, filed Sept. 7, 1962, now Patent No. 3,211,726 and Ser. No. 222,207, filed Sept. 7, 1962, now Patent No. 3,349,083.

(b) The 5α-halogen-6β:19-oxides or the 19:6-lactones of the 5α-halogen-6β-hydroxy-androstane-19-oic acids are then treated with a metallic reducing agent, for example with sodium and liquid ammonia or with zinc and acetic acid whereby $\Delta^5$-19-hydroxy-androstene or $\Delta^5$-androstene-19-oic acids respectively are formed. Alternatively the 5α-halogen-6β:19-oxido-androstanes formed in step (a) are first transformed into $\Delta^4$-3-oxo-6β:19-oxido-androstenes and there are reduced with zinc and acetic acid or aqueous alcohol to give $\Delta^5$-3-oxo-19-hydroxy-androstenes.

(c) The 19-oxygenated $\Delta^5$-androstenes formed in step (b) are then converted into $\Delta^4$-3 19-dioxo-androstenes or $\Delta^4$-3-oxo-androstene-19-oic acids by oxidation and rearrangement of the 5:6-double bond.

(d) Finally the angular substituent is the androstenes formed in step (c) is eliminated in known manner by acid or base treatment.

The compounds of the invention are prepared e.g. by reducing 5α-halogen-6β:19-oxido-androstanes with a metallic reducing agent. For example 5α-chloro-6β:19-oxido-androstanes are transformed into $\Delta^5$-19-hydroxy-androstenes by reduction with sodium and liquid ammonia. During this reaction acyloxy groups and ketones for example in 3- and 17-positions respectively are converted into hydroxyl groups as well. 5α-bromo-6β:19-oxido-androstanes are also reduced smoothly by treatment with zinc and acetic acid, whereby at low temperatures (for example at 40–50° C.). $\Delta^5$-19-hydroxy-androstenes are formed, at higher temperatures (such as at 100° C.) $\Delta^5$-19-acetoxy-androstenes are produced. In the $\Delta^5$-19-hydroxy-androstenes obtained free hydroxyl group may be acylated in known manner or acyloxy groups may be hydrolized to hydroxy groups. The $\Delta^5$-19-hydroxy-androstenes can be oxidized to Δ⁵-19-oxo-androstenes by means of chromium trioxide in pyridine or with chromium trioxide in acetone and sulfuric acid at 0° C. If the last mentioned oxidation is carried out at 20 to 30° C. Δ⁵-androstene-19-oic acids are formed which then can be esterified with diazomethane or diazoethane to give the methyl and ethyl esters respectively. In these esters a 17-oxo group may then be reacted with sodium acetylide to give a 17β-hydroxy-17α-ethinyl derivative.

The Δ⁵-3-oxo-19-hydroxy-androstenes are advantageously prepared by reducing a Δ⁴-3-oxo-6β:19-oxido-androstene with zinc and slightly aqueous or anhydrous acetic acid at a temperature below 50° C. (at higher temperatures Δ⁵-3-oxo-19-hydroxy-androstenes rearrange to Δ⁴-3-oxo - 19 - hydroxy-androstenes). Δ⁵-3-oxo-19-hydroxy-androstenes can be oxidized to Δ⁵-3:19-dioxo-androstenes or Δ⁵-3-oxo-androstene-19-acids as described above.

For the conversion into 19-nor-androstenes 19-oxigenated Δ⁵-3-hydroxy-androstenes are oxidized to Δ⁴-3-oxo-androstenes by means of aluminum tertiary butoxide and cyclohexanone in boiling toluene or by means of chromium trioxide in acetone-sulfuric acid and rearrangement of the Δ⁵-3-oxo-androstene obtained to Δ⁴-3-oxo-androstene by means of hydrochloric acid in chloroform or by heating with glacial acetic acid.

In the 19-oxygenated Δ⁴-3-oxo-androstene the angular substituent is eliminated in known manner. 19-hydroxy-Δ⁴-3-oxo-androstenes can be treated with strong base such as sodium hydroxide to yield Δ⁴-3-oxo-19-nor-androstenes. It is however of advantage to use the Δ⁴-3:19-dioxo-androstenes or Δ⁴-3-oxo-androstene-19-oic acids as intermediate for the production of 19-nor-androstenes. The former lose the aldehyde group under the influence of base such as potassium hydroxide or potassium methoxide, the latter are decarboxylated by heating in pyridine or acetic acid or by treatment with concentrated hydrochloric acid in an alcohol such as methanol or tertiary butanol.

The following examples illustrate the invention. The temperatures are given in degrees centigrade.

Example 1

750 mg. of lithium metal are dissolved in portions with stirring at −60° C. in 100 cc. of liquid ammonia. The blue solution is treated with 1.00 gram of 3β-acetoxy-5α-chloro-6β:19-oxido-17-oxo-androstane and rinsed with 50 cc. of absolute ether. While stirring, without external cooling, a current of dry nitrogen is then passed for 1.5 hours over the reaction solution and the evaporated ammonia is replaced by absolute ether. The excess lithium is decomposed with methanol, and the mixture is kept for 18 hours at room temperature, acidified with dilute sulfuric acid and extracted witth chloroform, to yield 857 mg. of an oil which crystallizes on being sprinkled with ethyl acetate+ether. In this manner Δ⁵-3:19:17-trihydroxy-androstene melting at 231–233° C. is obtained.

Example 2

A solution of 5 grams of 3β-acetoxy-5α-chloro-6β:19-oxido-17-oxo-androstane in 100 cc. of glacial acetic acid is treated at 85–90° C. in the course of 30 minutes with a solution of 7.5 grams of chromium trioxide in 7.5 cc. of water and 60 cc. of glacial acetic acid. After a further reaction period of 15 minutes the batch is diluted with water and extracted with methylene chloride. The methylene chloride solution is washed successively with water and sodium bicarbonate solution, dried with sodium sulfate and evaporated, to yield 2.2 grams of the lactone of 3β - acetoxy-5α-chloro-6β-hydroxy-17-oxo-androstane-19-acid which crystallizes on addition of ether and is freed from any adhering residual oxido compound by recrystallization from alcohol. The pure compound melts at 198–199° C.

A mixture of 2.0 grams of 19:6β-lactone of 3β-acetoxy-5α-chloro-6β-hydroxy-17-oxo-androstane-19-acid, a paste of active zinc prepared by washing 100 g. of zinc dust with N-acetic acid and then with glacial acetic acid, and admixed with 40 cc. of glacial acetic acid to improve its stirrability is stirred under reflux for 2 hours. After this time the conversion of the above lactone into Δ⁵-3β-acetoxy-17-oxo-anadrostene-19-acid is complete. The excess zinc is suctioned off, the filtrate concentrated in vacuum, the residue taken up in chloroform, the chloroform solution is washed with 2 N-sulfuric acid and then with water, dried and evaporated, to yield said acid in the form of colorless crystals. After having been recrystallized from methanol+ether they melt at 252–253° C. without evolution of gas.

By treating the above acid in chloroform solution with ethereal diazomethane solution at room temperature for a few minutes, the Δ⁵-3β-acetoxy-17-oxo-androstene-19 acid methyl ester is obtained which melts at 188–189° C. after recrystallization from ether.

A solution of 1.7 grams of Δ⁵-3β-acetoxy-17-oxo-androstene-19-acid methyl ester in 200 cc. of methanol is treated under nitrogen with a solution of 2 grams of potassium carbonate in 10 cc. of water and boiled and stirred for 1 hour. The reaction mixture is cooled, considerably concentrated under vacuum and then extracted with chloroform. The chloroform solution is dried and evaporated, to yield 1.5 grams of Δ⁵-3β-hydroxy-17-oxo-androstene-17-acid methyl ester which crystallizes from isopropanol in crystals melting at 188–190° C.

1.25 grams of the latter compound are dissolved in 50 cc. of acetone and the solution is treated at 0° C. with 1.5 cc. of a solution, diluted with water to 50 cc. of 13.3 grams of chromium trioxide and 11.5 cc. of concentrated sulfuric acid, and the mixture is stirred for 10 minutes. The reaction mixture is then poured into 100 cc. of an aqueous sodium acetate solution of 10% and extracted with methylene chloride. The crude product obtained from the extracts is the Δ⁵-3:17-dioxo-androstene-19-acid methyl ester which is dissolved in 100 cc. of methanol. The solution is treated with 5 grams of potassium hydroxide and heated for 5 hours at the boil under nitrogen. 7.5 cc. of glacial acetic acid are then added and the whole is evaporated almost to dryness in a water-jet vacuum. The residue is taken up in methylene chloride, washed with water and the dried organic solution is evaporated. From the residue Δ⁴-3:17-dioxo-19-nor-androstene is obtained by chromatography on alumina.

Example 3

3.0 grams of zinc dust are added to a solution of 1.0 gram of 3β-acetoxy-5α-bromo-6β:19-oxido-17-oxo-androstane in 30 ml. of glacial acetic acid, and the mixture stirred for 12 hours at 100° C. It is then cooled, any unconsumed zinc is filtered off, and the filtrate diluted with methylene chloride. The solution is then washed with water, dilute sodium bicarbonate solution, and water, dried and evaporated. There are obtained 897 mg. of Δ⁵-3β:19-diacetoxy-17-oxo-androstene which, after being crystallized from methanol+water melt at 103–105° C.; optical rotation $[\alpha]_D^{25}=-39.6°$ (in chloroform); IR bands, inter alia at 5.75μ, 5.76μ, 8.15μ and 9.73μ.

Example 4

2.5 grams of 3β:17β-diacetoxy-5α-bromo-6β:19-oxido-androstane are dissolved in 75 ml. of glacial acetic acid. To this solution are added 10.0 grams of zinc dust and the mixture stirred for 10 hours at 100° C. It is then cooled, the unconsumed zinc filtered off, and the filtrate evaporated in a water-jet vacuum. The residue is taken up in methylene chloride and water, the organic solution washed neutral, dried and evaporated. The residue (1.97 grams) which contains the Δ⁵-3β:17β:19-triacetoxy-androstene, is dissolved in 100 ml. of methanol and, after the addition of 2.5 grams of potassium carbonate in 10 ml. of water, the mixture is heated to the boil for 3 hours. After that, 3.5 ml. of glacial acetic acid are added, the solution concentrated in a water-jet vacuum to about 50 ml., extracted again with a 5:1 mixture of methylene chloride and methanol, the extracts washed with water, dried and evaporated. By crystallizing the residue from ethyl acetate+ether there are obtained 1.35 grams of pure $\Delta^5$-3$\beta$:17$\beta$:19-trihydroxy-androstene of melting point 231–233° C.

Example 5

A solution of 1.0 gram of $\Delta^4$-3:17-dioxo-6$\beta$:19-oxido-androstene in 20 cc. of glacial acetic acid is mixed with 25 grams of zinc dust (activated by washing with dilute acetic acid, water and glacial acetic acid) and the whole is stirred for 20 minutes at 25–30° C. The unconsumed zinc is then suctioned off, the filter residue is rinsed with glacial acetic acid and the filtrate is concentrated in a water-jet vacuum at 25 to 30° C. The residue is taken up in chloroform, and the solution is washed with water and sodium bicarbonate solution, dried and evaporated in a water-jet vacuum. By washing the crystalline residue with a mixture of ether and petroleum ether, there are obtained 640 mg. of $\Delta^5$-3:17-dioxo-19-hydroxy-androstene melting at 168 to 170° C.

When a chloroform solution of this compound is treated for 5 minutes with hydrogen chloride gas and then washed until it is neutral, there is obtained an almost quantitative yield of $\Delta^4$-3:17-dioxo-19-hydroxy-androstene which melts at 170–171° C. after recrystallization from acetone+hexane; the melt then solidifies again and has a melting point of 181° C.

Example 6

8 cc. of caprylchloride are stirred within 2 minutes at 10 to 15° C. into a solution of 12.2 grams of 6$\beta$:19-oxido-testosterone in 36 cc. of pyridine. The cooling is then removed and the mixture is stirred on for 30 minutes, then treated with ice and ice water, stirred for 2 hours and taken up in benzene. The benzene solution is washed with 2 N-hydrochloric acid and then with ice-cold sodium bicarbonate solution of 5% strength and dried with sodium sulfate. Evaporation under vacuum yields 17.5 grams of $\Delta^4$-3-oxo-6$\beta$:19-oxido-17$\beta$-decanoyloxyandrostene as a pale oil.

A solution of 8.75 grams of this crude product in 8.75 cc. of benzene is stirred into a paste of 250 grams of zinc dust (activated by washing with dilute acetic acid and then with concentrated acetic acid) in glacial acetic acid. The reaction mixture is stirred for 1½ hours at 17 to 24° C., diluted with 400 cc. of benzene, the excess zinc is suctioned off and rinsed with benzene. The benzene solution is washed with water and then with ice-cold sodium bicarbonate solution, dried with sodium sulfate and evaporated under vacuum.

The residue contains as main product $\Delta^5$-3-oxo-17$\beta$-decanoyloxy-19-hydroxy-androstene; it is dissolved in 50 cc. of chloroform, treated with 5 cc. of concentrated hydrochloric acid and shaken for 5 minutes at 0 to 5° C., then separated, and the chloroform layer is washed with sodium bicarbonate solution, dried and evaporated in a water-jet vacuum. Yield: 8.2 grams of crystalline $\Delta^4$:3-oxo - 17$\beta$ - decanoyloxy - 19 - hydroxy - androstene which melts at 99 to 100° C. after having been recrystallized from ether.

Example 7

A solution of 4.0 grams of $\Delta^4$-3-oxo-6$\beta$:19-oxido-17$\beta$-hydroxy-androstene in 20 cc. of glacial acetic acid is added to a paste prepared from glacial acetic acid and 160 grams of zinc dust activated by washing with aqueous acetic acid and then with anhydrous acetic acid. While cooling, the mixture is stirred for 35 minutes at 25 to 30° C; the excess zinc is then suctioned off and rinsed with glacial acetic acid. The filtrate is cautiously evaporated under reduced pressure. The residue contains $\Delta^5$-3-oxo-17$\beta$:19-dihydroxy-androstene; it is taken up in chloroform and agitated for 5 minutes with 12 N-hydrochloric acid. The chloroform solution is washed with sodium bicarbonate solution, dried with sodium sulfate and evaporated, to yield 3.4 grams of $\Delta^4$-3-oxo-17$\beta$:19-dihydroxy-androstene which melts at 197° C. after having been recrystallized from acetone.

Example 8

A solution of 10 grams of $\Delta^4$-3:17-dioxo-19-hydroxy-androstene in 1 liter of acetone is treated at 10° C. with 30 cc. of an aqueous chromic acid solution containing in 100 cc. 27 grams of chromium trioxide and 23 cc. of concentrated sulfuric acid and the mixture is stirred for 30 minutes at 10 to 15° C. The excess chromic acid is decomposed with isopropanol, the reaction mixture diluted with 1 liter of benzene and the undissolved salts are filtered off the organic solution which is then washed with 3×50 cc. of water with addition of a small amount of ammonium sulfate, then washed once with ammonium sulfate solution of 43% strength, twice dried over sodium sulfate and evaporated in vacuum. Yield: 10 grams of $\Delta^4$-3:17-dioxo-androsten-19-acid which, after having been recrystallized from ether, melts at 146° C. with decomposition. When an ethereal-methanolic solution of said acid is mixed with ethereal diazomethane solution, its methyl ester melting at 136 to 138° C. is obtained.

When the isomeric $\Delta^5$-3:17-dioxo-19-hydroxy-androstene is oxidized as described above instead of the $\Delta^4$-3:17-dioxo-19-hydroxy-androstene, the resulting main product is $\Delta^5$-3:17-dioxo-androstene-19-acid which can be esterified with diazomethane to yield its methyl ester melting at 241 to 243° C.

Example 9

2.0 grams of $\Delta^5$-3$\beta$-acetoxy-17-oxo-androstene-19-oic acid methyl ester (described in Example 2) are dissolved in 50 ml. of toluene and after the addition of a solution prepared from 2.0 grams of potassium and 50 ml. of tertiary amyl alcohol, the air above the reaction mixture is replaced by dry nitrogen. A weak current of pure, dry acetylene is then introduced for twelve hours with stirring. The reaction mixture is then diluted with water, acidified with hydrochloric acid and the volatile portions are removed by steam distillation. The precipitated product is taken up in methylene chloride, the extracts washed with sodium bicarbonate solution and water, dried and evaporated. The residue which contains the $\Delta^5$-3$\beta$-acetoxy-17$\beta$-hydroxy-17$\alpha$-ethinyl-androstene-19-oic acid methyl ester is dissolved in 50 ml. of methanol and after addition of 1.0 gram of potassium carbonate and 10 ml. of water stirred for 14 hours at room temperature. The $\Delta^5$-3:17-dihydroxy-17$\alpha$-ethinyl-androstene-19-oic acid methyl ester is isolated by dilution with water and extraction with methylene chloride. The crude product is dissolved in 100 ml. of toluene and dried by azeotropic distillation of 20 ml. of solvent. Then 5.0 grams of aluminum tertiary butoxide and 10 ml. of cyclohexanone are added, the mixture is heated for 3 hours under reflux, cooled and then washed up in the usual way by steam distillation and extraction with benzene. The $\Delta^4$-3-oxo - 17$\beta$ - hydroxy - 17$\alpha$ - ethinyl-androstene-19-oic acid methyl ester is purified by chromatography on alumina.

507 mg. of the pure ester are dissolved in 25 ml. of ethanol. The solution is heated to reflux for 30 minutes under nitrogen, then 2.5 g. of potassium hydroxide in 7.5 ml. of water are added and heating is continued under nitrogen for another 2 hours. Then the reaction mixture is cooled, water and 5.0 ml. of acetic acid are added and the mixture is extracted with methylene chloride. The extracts are washed with water, dried and the solvent removed under reduced pressure. There is obtained 485 g. of a crude residue from which by chromatography on alumina the pure $\Delta^4$-3-oxo-17$\beta$-hydroxy-17$\alpha$-ethinyl-19-nor-androstene is isolated.

If the crude $\Delta^5$-3$\beta$-acetoxy-17$\beta$-hydroxy-17$\alpha$-ethinyl-androstene-19-oic acid methyl ester obtained in the above example is purified by chromatography on alumina, then hydrogenated with a palladium-or-charcoal catalyst in pyridine solution the $\Delta^5$-3$\beta$-acetoxy-17$\beta$-hydroxy-17$\alpha$-vinyl-androstene-19-oic-acid methyl ester is obtained. By carrying out the hydrogenation in ethyl acetate instead of pyridine the Δ⁵-3β-acetoxy-17β-hydroxy-17α-ethyl-androstene-19-oic acid methyl ester is obtained.

In a completely analogous way as described above for the 17α-ethinyl compound the 17α-vinyl and 17α-ethyl derivative is transformed into Δ⁴-3-oxo-17β-hydroxy-17α-vinyl- and -17α-ethyl-19-nor-androstene respectively.

Example 10

8.1 grams of 3β:17β-diacetoxy-5α-bromo-6β:19-oxido-androstane are dissolved in 170 ml. of glacial acetic acid. The solution is stirred, diluted with 8 ml. of water and kept at 40 to 50° C. while 50 grams of zinc dust are added within 40 minutes. The mixture is then filtered, the filtrate concentrated under reduced pressure, diluted with water and extracted with methylene chloride. The extracts are washed with dilute sodium bicarbonate solution, and water, dried and the solvents removed under reduced pressure. There is obtained 6.2 grams of residue which by recrystallization from methylene chloride-petroleum ether yields 5.9 grams of pure Δ⁵-3β:17β-diacetoxy-19-hydroxy-androstene of melting point 145–146°;

$$[\alpha]_D = -58°$$

(in chloroform).

A solution of 6.0 grams of this substance in 170 ml. of acetone is cooled to 0° C. and after addition of 7 ml. of a 4 N solution of chromium trioxide in dilute sulfuric acid the mixture is stirred for 20 minutes at 0° C. then diluted with water and the product is extracted with ether. The extracts are washed neutral with dilute sodium bicarbonate solution and with water, dried and concentrated to dryness. There is obtained 6.1 g. of Δ⁵-3β:17β-diacetoxy-19-oxo-androstene which after recrystallization from ether-petroleum ether melts at 118–122°. The product shows in the IR-spectrum bands inter alia, at 3.73, 5.80, 7.35, 8.10 and 9.70μ.

Example 11

Under the conditions described in Example 2 the reduction with zinc of 1.00 gram of the 6:19-lactone of the 3β:17β - diacetoxy - 5α - chloro-6β-hydroxy-androstane-19-acid yields after recrystallization of the crude product from methylene chloride-ether 815 mg. of pure Δ⁵-3β:17β-diacetoxy-androstene-19-acid melting at 201–202° C.

$$[\alpha]_D = -115°$$ (in chloroform).

What is claimed is:
1. Δ⁵-3β-acetoxy-17-oxo-androstene-19-oic acid.
2. Δ⁵ - 3β - hydroxy-17α-ethinyl-17β-hydroxy-androstene-19-oic acid methyl ester.
3. Δ⁵ -3β - acetoxy-17α-vinyl-17β-hydroxy-androstene-19-oic acid methyl ester.
4. A compound of the formula

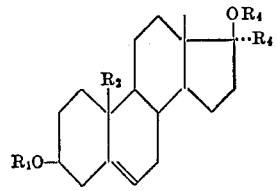

in which $R_1$ and $R_3$ represent a member selected from the group consisting of hydrogen and the acyl radical of a carboxylic acid containing up to 15 carbon atoms, $R_2$ represents a member selected from the group consisting of hydroxymethyl, lower alkanoyloxymethyl, carboxy and carbo-lower alkoxy and $R_4$ represents a member selected from the group consisting of lower alkenyl and lower alkinyl.

5. A compound of the formula

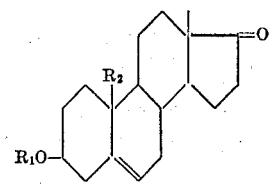

in which $R_1$ represents a member selected from the group consisting of hydrogen and the acyl radical of a carboxylic acid containing 3 to 15 carbon atoms and $R_2$ represents a member selected from the group consisting of carboxy, carboxy and carbo-lower alkoxy.

6. A compound of the formula

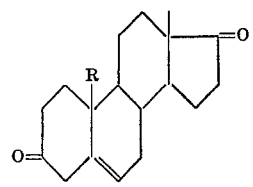

in which R represents lower alkanoyloxy-methyl.

7. A compound selected from the group consisting of compounds of the formula

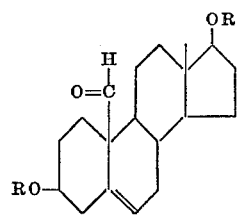

in which R is the same and selected from the group consisting of H and acetyl.

References Cited

UNITED STATES PATENTS 2,856,415   10/1958   Mihina _____ 260—397.4

ELBERT L. ROBERTS, Primary Examiner

U.S. Cl. X.R.

260—397.4

PO-1050
(5/69)

UNITED STATES PATENT OFFICE
CERTIFICATE OF CORRECTION

CASE 4574/B/C/CONT. 2

Patent No. 3,458,539     Dated July 29, 1969

Inventor(s) ALBERT WETTSTEIN ET AL

It is certified that error appears in the above-identified patent and that said Letters Patent are hereby corrected as shown below:

Column 7, line 55, in the formula

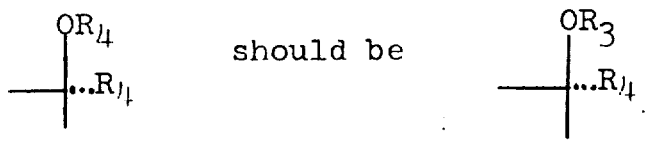

Column 8, line 24, delete "carboxy," first occurrence.

SIGNED AND SEALED
NOV 17 1970

(SEAL)
Attest:

Edward M. Fletcher, Jr.
Attesting Officer

WILLIAM E. SCHUYLER, JR.
Commissioner of Patents